US005675149A

United States Patent [19]
Wood et al.

[11] Patent Number: 5,675,149
[45] Date of Patent: Oct. 7, 1997

[54] COMPACT THERMAL CAMERA

[75] Inventors: Roland Andrew Wood, Bloomington; David Kubisiak, Chanhassen; Thomas Michael Rezachek, Cottage Grove, all of Minn.

[73] Assignee: Honeywell Inc., Minneapolis, Minn.

[21] Appl. No.: 700,586

[22] Filed: Aug. 8, 1996

Related U.S. Application Data

[63] Continuation of Ser. No. 315,369, Sep. 30, 1994, abandoned.

[51] Int. Cl.[6] .................................................. G01J 5/02
[52] U.S. Cl. ........................... 250/332; 250/330; 250/334
[58] Field of Search ................................ 250/330, 334, 250/332

[56] References Cited

U.S. PATENT DOCUMENTS

| | | | |
|---|---|---|---|
| 3,812,357 | 5/1974 | Flogaus et al. | 250/332 |
| 4,639,774 | 1/1987 | Fried | 358/105 |
| 4,965,448 | 10/1990 | Morse et al. | 250/252.1 |
| 4,999,614 | 3/1991 | Ueda et al. | 340/588 |
| 5,159,199 | 10/1992 | LaBaw | 250/339.02 |
| 5,206,503 | 4/1993 | Toops | 250/234 |
| 5,220,189 | 6/1993 | Higashi et al. | 257/467 |
| 5,227,888 | 7/1993 | Haga | 358/213.28 |
| 5,386,117 | 1/1995 | Piety et al. | 250/330 |
| 5,453,618 | 9/1995 | Sutton et al. | 250/334 |

FOREIGN PATENT DOCUMENTS

| | | |
|---|---|---|
| 19400442 | 3/1994 | Germany. |
| 22203312 | 10/1988 | United Kingdom. |

*Primary Examiner*—Constantine Hannaher
*Attorney, Agent, or Firm*—Albert K. Kau; Charles J. Ungemach; John G. Shudy, Jr.

[57] ABSTRACT

A low-cost portable handheld still-frame thermal camera for capture of calibrated digital thermographic infrared images having a lens assembly, a slideable linear array of uncooled 8–12 um thermal IR sensors, a slider actuation mechanism, and associated digital processing capability for calibrating, displaying, and storing images captured by the camera. The sensors are preferably thermoelectric sensors. The lens passes infrared radiation, the array is contained in an evacuated chamber, and operates at room temperature. The thermographic images may be displayed immediately or remotely or may be printed by conventional techniques.

16 Claims, 3 Drawing Sheets

COMPACT THERMAL CAMERA

This application is a continuation of application Ser. No. 08/315,369, filed Sep. 30, 1994 now abandoned.

FIELD OF THE INVENTION

The present invention relates to the field of photography, and in particular, to a device for digital electronic capture and processing of images in a scene emitting in the infrared (IR) region of the electromagnetic spectrum. In particular, the present invention teaches attainment of an extremely low-cost camera suitable for still-frame "instant" 8–12 um infrared (IR) photography.

BACKGROUND OF THE INVENTION

Cryogenically cooled 8–12 um IR cameras are commercially available, typically producing video imagery at about 30 frames per second with a scene thermal resolution of about 0.1° Celsius. The 30 Hz frame rate is typically chosen in order to allow imagery of moving targets. These IR cameras are however too costly and heavy for many applications.

However, to the inventor's knowledge, no 8–12 um IR camera exists which is analogous to the widespread handheld still-frame cameras used in visible "instant" photography, i.e. a low-cost, compact, hand-held, room-temperature IR camera capable of recording still-frame IR imagery of stationary or slow-moving targets, and displaying the calibrated image to the operator with negligible delay.

A compact pushbroom IR camera using a linear thermal array was described by Wilson et al. Proc IRIS DSG Boulder, Colo., August 1991. This camera contained no moving parts or digital processor. This camera was able to produce two dimensional IR images of stationary objects by panning the entire camera, a mode of operation unsuitable for hand-held operation. No radiometric calibration was provided in the Wilson camera.

SUMMARY OF THE INVENTION

Recent advances in thermal IR sensors capable of operating at room temperature have been made, exemplified by U.S. patent application Ser. No. 08/203,739, owned by the same assignee as the present invention and hereby incorporated by reference herein now U.S. Pat. No. 5,420,419. This application teaches IR imaging techniques which use two dimensional arrays of bolometers to be demonstrated which can record IR images at video framerates of about 30 Hz. These arrays of bolometers may allow lower-cost and more-compact 8–12 um IR cameras to be developed in the future, again producing video imagery at about 30 frames per second with 0.1° C. resolution.

A low-cost compact hand-held uncooled IR camera suitable for recording and displaying still-frame calibrated 8–12 um IR images of stationary or slow-moving targets with a sensitivity of about 0.1° C. The camera uses a linear array of room temperature thermal IR sensors contained in an evacuated chamber, moved across the focal plane of a suitable IR-transmitting lens in an interval of about 1 second, by an actuator mechanism. The camera contains suitable means for calibrating, recording and displaying the still-flame IR images with negligible time delay. The images are accurately calibrated, to show the temperature of any part of the target scene as determined by the emitted IR radiation. The images are electronically recorded within the camera for later display or hard-copy printout using conventional display equipment.

DESCRIPTION OF THE PREFERRED EMBODIMENT

Figure 1:
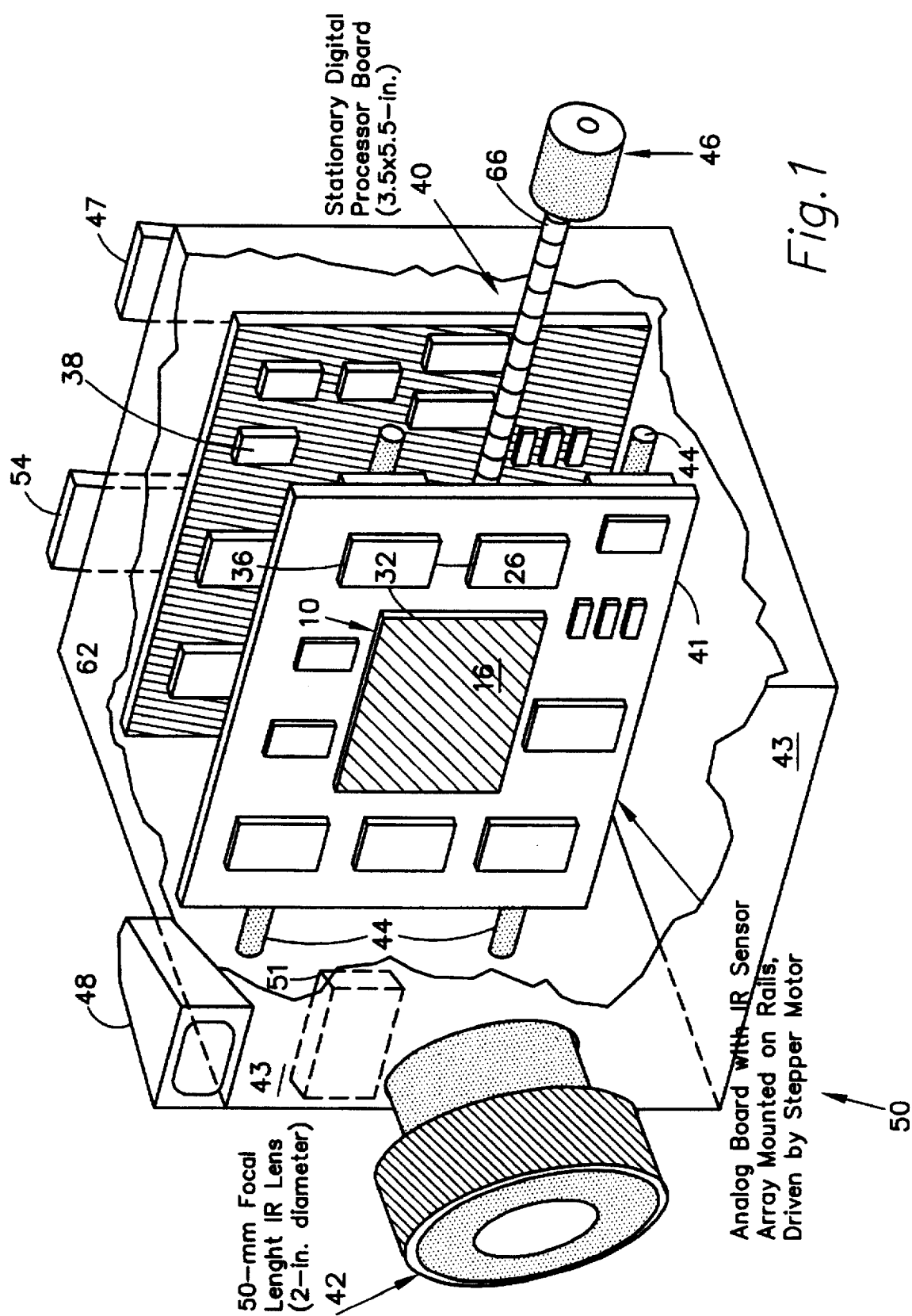
FIG. 1 is a perspective view depicting the main subcomponents of the present invention.
Figure 2:
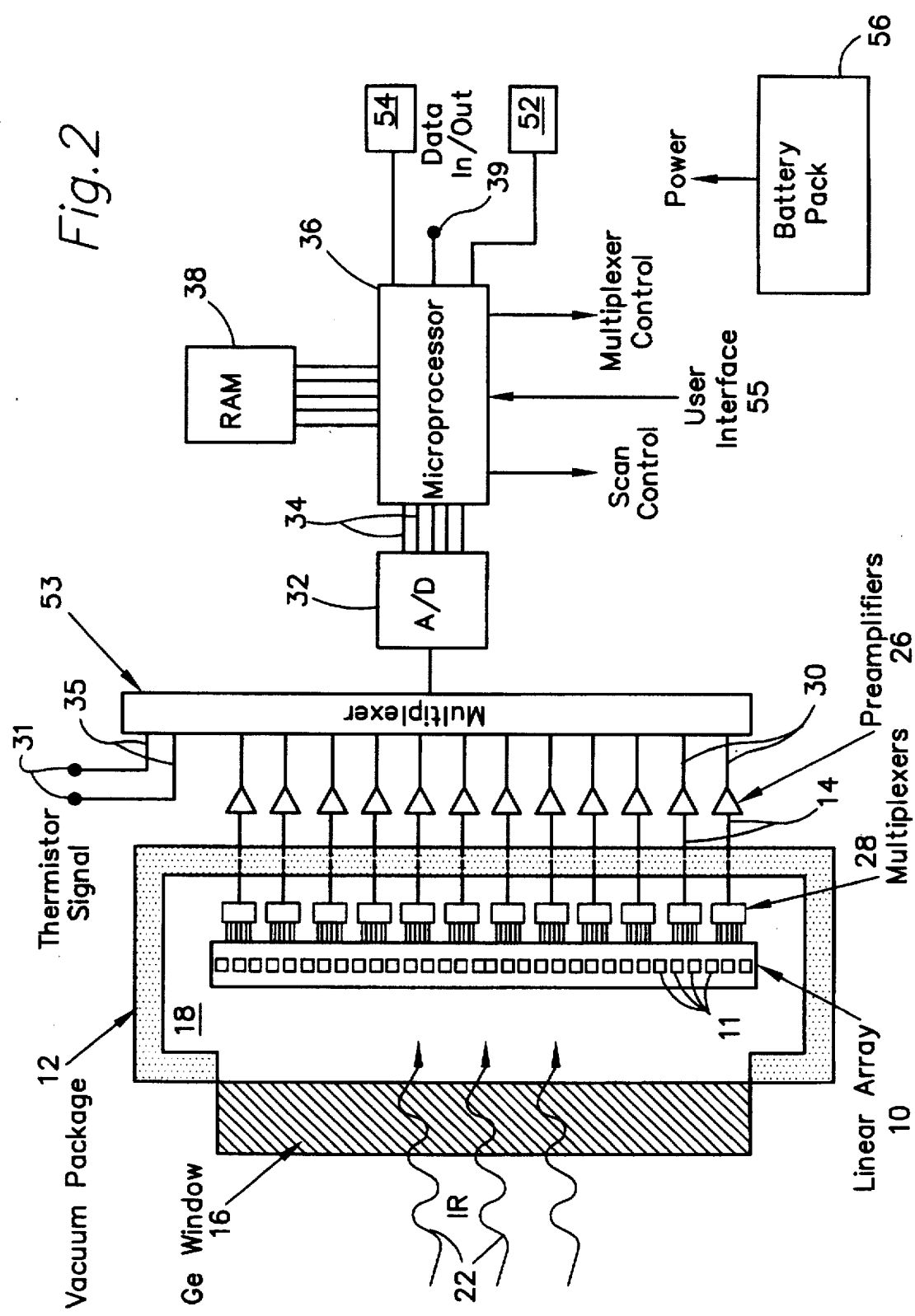
FIG. 2 is a simplified functional diagram, depicting the IR radiation sensitive subassembly coupled to schematically-drawn electrical components.

Referring to FIG. 1, the camera assembly 50 of the present invention has few major sub components: a housing 43 supporting an IR transmitting lens 42 and field-of-view indicating device 48, sliding electronics board 41 holding the IR sensors, and a stationary electronics board 40. The sliding board slides on rails 44, with motion actuated by a stepper motor and lead screw 46. One or more linear arrays 10 of IR sensors 11 are enclosed in the package 12, which is fitted with electrical leads 14 and IR transparent window 16. The slider motion is in a direction perpendicular to the line of the sensors 11, and perpendicular to the optical axis of the lens 42. Each individual thermal IR sensor 11 employed in the preferred embodiment is a mosaic of four 3-mil thermoelectric (TE) sensors, as described by U.S. Pat. No. 5,220,189 to Higashi and Johnson and assigned to the same assignee as the present invention and incorporated herein by reference. The sensor package is preferably evacuated, or filled with gas 18 having low thermal conductivity (e.g. Xenon). The TE sensors 11 respond to incident IR radiation (denoted by arrows 22) to produce electrical output signals indicative of the IR radiation impacting each discrete TE sensor 11, as is known and understood in the art in the light of Higashi and Johnson and Wood et al cited above.

The individual TE sensors 11 are sensitive to a wide range of IR radiation wavelengths, from the shortest IR wavelengths (about 1 um) to wavelengths approaching the side dimensions of the individual TE sensors (tens of um). The long wavelength limit may be extended by the use of planar micro antennas which capture longer wavelengths, as known and understood in the light of U.S. Pat. No. 4,654,622 to Wood et al., commonly assigned as the present invention and also incorporated herein by reference.

In the present embodiment the range of sensitive wavelengths is limited to those wavelengths effectively transmitted by the lens 42 and package window 16. Although those skilled in the art recognize that improved transmission coatings will increase the effective wavelengths in the future in the current embodiment, the lens is a 4.28 cm focal length germanium lens 42, with anti-reflection coatings to efficiently transmit 8 to 12 um wavelengths. The package window 16 is germanium, also with anti reflective coating to efficiently transmit 8 to 12 um wavelengths.

The electrical signals from the individual TE sensors 11 are fed to an array of integrating preamplifiers 26 and to one or more A/D converters 32. Multiplexers 28 may be interposed before or after the preamplifiers to allow the number of preamplifiers to be less than the number of TE sensors 11 in the array 10, in order to allow a tradeoff between component count, package pin count, and camera sensitivity, if so desired. In the present embodiment, twelve 8:1 multiplexers 28 are placed within the sensor package, between the 96-pixel array 10 and twelve preamplifiers 26, and a 16:1 multiplexer 53 is placed between the twelve preamplifiers 26 and a single A/D converter 32. Two of the 16:1 multiplexer input lines 35 are used to allow signals from thermistors 31 to be periodically sampled by the A/D converter 32. The A/D converters 32 have a least-significant-bit of sufficiently small size that negligible quantization noise is introduced. The range of the A/D converters 32 are selected to allow calibration of images having both very hot and very cold targets present within the same scene. A 16-bit A/D is used in the present embodiment.

In the present embodiment, sensor signals are amplified and integrated, multiplexed and digitized using components mounted on the sliding circuit board, so that low-level sensor signals have short wiring distances, and the flexible cable carries a digital signal which cannot be corrupted by noise. If desired, to reduce the number of components required to be moved by the slider mechanism, analog sensor signals may be passed along the flexible cable, provided care is taken to ensure added electrical noise is negligible.

Analog temperature signals from thermistors 31 or thermocouples or other suitable electronic sensors are sampled by the A/D converters 32 as commanded by the digital processor 36. This makes the temperature of selected sub-assemblies available to the digital processor 36, as required for accurate radiometric calibration of the digitized sensor signals. In the present embodiment, the temperature of one sub-assembly is measured, that of a "reference" plate 51 of known emissivity, providing IR radiation to the sensor array at selected times. In the present embodiment, the reference plate is a stationary plate placed to one side of the lens 42 optical axis, between the lens 42 and the Ge window 16, providing calibrating thermal radiation to the sensor array 10 during the first part of its sliding motion. If desired the temperature of the reference plate 51 may be stabilized, to allow easier camera calibration. If desired, the temperature of the array may be measured instead of that of the reference plate.

The digitized signals from the A/D converters 32, and control signals from the digital processor 36, are carried on a flexible line 34 between the stationary board 40 and moving board 41. The digital processor 36 accesses memory 38, containing control programs, calibration files, and space for image storage. Under program direction, the digital processor 36 controls the array scan mechanism 46, multiplexers 28,53, integrating preamplifiers 12 and A/D converters 32. For lowest electrical switching noise the multiplexers 28,53 may be scanned in a Gray code sequence, and digital transitions timed to occur during intervals when the integrating preamplifiers 26 are not integrating.

In the present camera, a stepper motor 46 and lead screw 66 is used to provide the sliding action, allowing precise and repeatable slider motion under control of the digital processor without need to measure slider position. Other means of providing mechanical slider actuation mechanisms are well known, and may be used. For example, dual rails for controlling the movement of the board 41 coupled to a spring that is suitable geared and manually activated, or a pulley system, or a single driving motor and separate rewind motor, as is appreciated by one of skill in the art. The processor 36 may be programmed to compensate for varying velocity of the board 41 due to aging effects of or increased load on the driving member so that even rather crude methods of propelling the board 41 may be used. Further, known components may be used to drive board 41, including optical disk scanning drives, floppy disk head drives, and other high volume parts to contain cost of the camera.

The electrical signals from the TE sensors 11 are closely linear with incident radiation power, and similar in magnitude. Lens 42 transmission is fairly uniform, so that good quality images are obtained in the present camera embodiment by direct representation of sensor signal amplitudes on a display device, with no sensor signal correction apart from offset compensation. However, for accurate radiometric applications, the signal amplitudes may be digitally corrected before display, to allow the radiometric temperature of the scene to be accurately determined and represented by different image brightness or colors. In the present embodiment this correction is accomplished with the digital processor 36, for each individual pixel 11, for each slider position, by storing digital calibration data in camera memory 38. Camera calibration constants are determined by holding a plate (not shown) of known emissivity, at a range of different known temperatures over the desired target temperature range, before the lens 42 whilst operating the camera; during this calibration the digital processor 36 is programmed to use the sensor signals so obtained to calculate the required sensor calibration constants and store them in camera memory 38 for retrieval at any desired later time. Sensor signals obtained during the initial part of the sliding motion (when the sensors receive radiation from a reference plate 51 of known temperature) are used to remove global and pixel-to-pixel offsets caused by dc drifts in the electronics.

When imaging scenes with wide temperature range, the digital processor 36 may be programmed to automatically scale the pixel signals to lie within the brightness and color values displayable on the display device used by the operator.

For the digital correction and display of radiometrically accurate images, an assumed emissivity of the target may be entered into the digital processor if desired, using a data link port 39 or push buttons 55 on the camera.

The processor 36 supplies and receives serial or parallel digital data via a conventional port 39, for communication of image data and programs with external devices as desired. If desired, an insertable and removable memory device 54 (e.g. a memory card) may be incorporated in the camera, to allow storage, loading and unloading of images or programs.

If desired, a compact display device 47 may be incorporated in the camera to allow the operator to immediately view the IR image. Operator pushbuttons 55 may allow any part of the IR image to be selected with a cursor, and the digital processor 36 programmed to display calibrated scene temperatures from the selected region of the image. Digital or alphanumeric image information may be readily superimposed upon the display 52 for immediate viewing by the operator, as is known in the display art.

The time required to acquire one image is about 1 second. The angular resolution of the camera is made adequate to allow useful resolution of image detail, but intentionally lower resolution than conventional photographic cameras, so that hand held operation is possible with a one second image capture time, without camera shake degrading the image quality noticeably. In the present camera, the angular resolution is set by the 150 um pixel size and the 5 cm focal length lens 42, giving an angular resolution of 3 milliradians, about ten times worse than that of the human eye. To produce more pleasing image quality with a low-resolution image, the digital processor 36 may be programmed to automatically insert image pixels in each row and column between sensor data pixels, the inserted image pixels having values generally midway between sensor data pixel values.

If desired, successive images obtained from the camera may be subtracted by the digital processor 36, so that changes within the field of view may be readily detected, as desirable for automated surveillance applications. In a surveillance mode of operation, the slider is activated continuously, so that the scene is imaged about once every second. Successive images are digitally subtracted on a pixel-by-pixel basis, so that pixels viewing stationary objects of unchanged temperature are reduced to about the electronic noise level of the camera. Pixels viewing an object which moves or changes temperature, however, produce signals well above the noise level, and may be detected automatically with simple algorithms. If desired, successive images may also be averaged, to produce an image of the scene with enhanced sensitivity, allowing the exact position of any moving or temperature-changing object to be readily determined by reference to the stationary objects in the scene.

All sub components of the camera are compact and light and robust, to allow easy transport and hand-held use of the camera. Operation is similar to a conventional still-frame camera: the camera is aimed at the scene, the focus of the lens 42 is adjusted for the proper range, and the camera is held steadily for a period of about 1 second, after which the image is displayed with negligible delay. The operator can immediately inspect images and determine the scene radiometric information. Images may be stored in camera memory 38, or removed by a removable memory device 54, or transmitted to other devices via a data link 39.

Aiming of the camera at the scene may be aided by a simple optical field-of-view indicator 48, as commonly used on photographic still-frame cameras.

Focusing of the lens may be aided by conventional range finders or distance measurement devices and a calibrated focusing scale on the lens 42, as well known in still-frame photographic cameras. Alternatively, the sensor array 10 may be commanded to slide to the center of the field of view, and a linescan displayed on the display 47, allowing the lens 42 to be focused to attain maximum sharpness of the features on the linescan.

During the interval in which the camera is held steady, the digital processor 36 commands the slider mechanism 46 to slide the moveable board 41 across the focal plane of the lens 42 at a controlled rate whilst sensor signals are digitized by the digital processor 36 and stored in memory 38. For each lateral slide movement of the array 10 by a distance equal to the pixel width, the electrical signal from each pixel 11 in the array 10 is measured and stored. If desired, slower slide velocities, or multiple scans of any desired region of the scene, can be employed to allow sensitivity improvement by multiple measurement and averaging of sensor signals: in this case, a stable platform for example, a tripod mounting of the camera may be required, analogous to long exposures of visible photographic still frame cameras. For hand-held use, scan times of not more than about 1 second are desirable, to ensure negligible image distortion caused typically by operator movement or camera shake.

The image acquisition time of 1 second is required using a single linear array of presently available sensors, if an image sensitivity of about 0.1° C. and an image scan of about 96 pixels is required, because presently available TE sensors with the required sensitivity have a thermal response time of about 10 milliseconds. Thus it is necessary to allow a time of about 96×10=960 msec to acquire a 96×96 the image.

Figure 3:
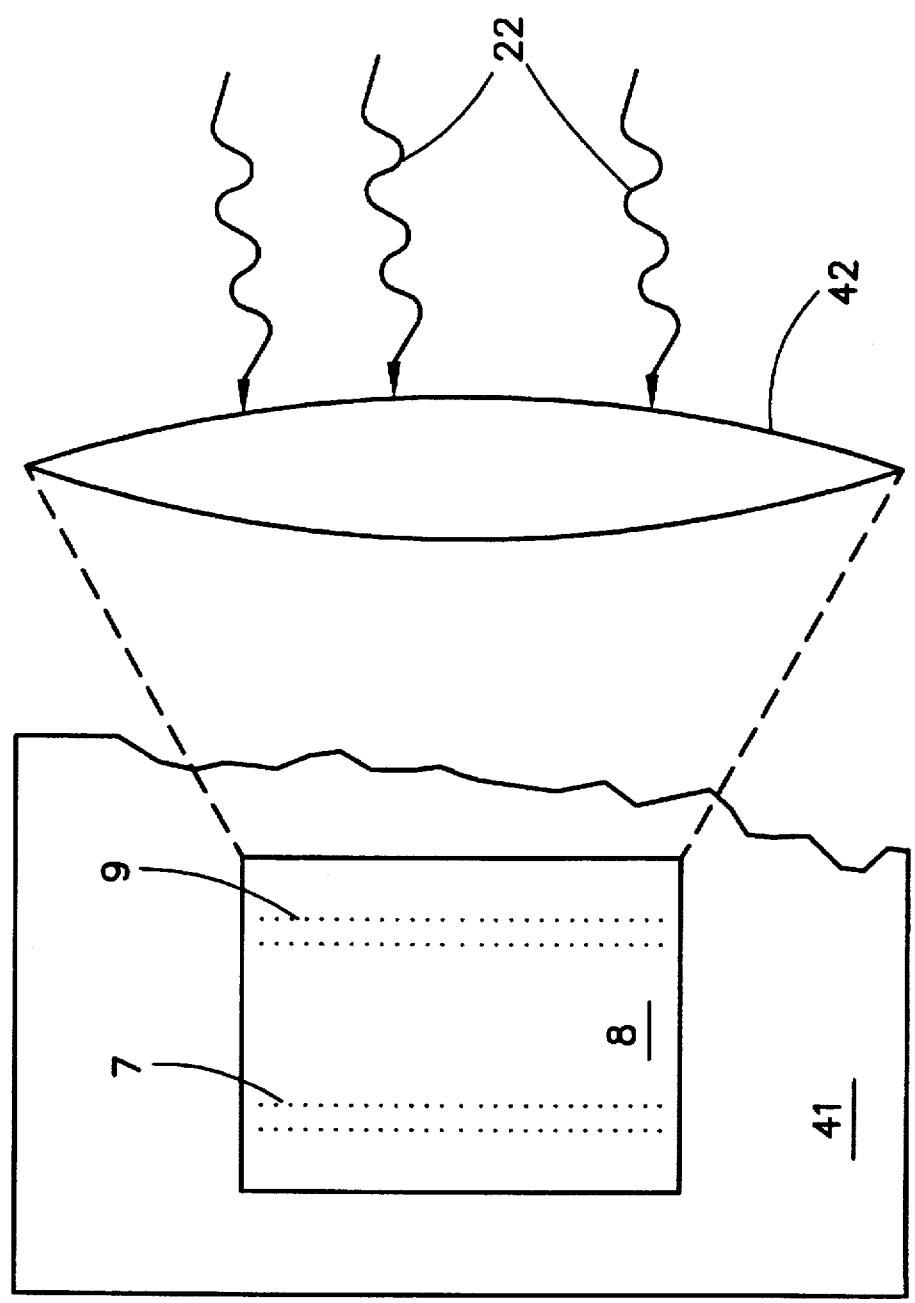

If desired several parallel linear arrays of sensors may be employed rather than a single array, allowing approximately proportionately faster image acquisition times, with the penalty of added complexity and cost. If viewing scenes where reduced sensitivity is acceptable, TE sensors with faster thermal response times may be chosen, allowing approximately proportionately faster image acquisition times. Illustrated in FIG. 3 is a dual linear array having linear arrays 7 and 9, depicted by parallel dashed lines, disposed on the sliding electronics board 41. The linear arrays 7,9 are each moved by half the width of the image area 8, defined by the rectangular solid line of FIG. 3.

If desired, the slider mechanism 46 may move the array 10 to the optical axis of the lens 42 and halted, allowing the camera to be used to obtain IR images of objects moving through the field of view. Examples of this are 1) IR imagery of ground targets obtained from a moving aircraft 2) IR imagery of objects moving on a conveyor belt.

In the present embodiment, camera power is obtained from a small battery pack 56. For optimum battery life and lowest electrical pickup noise, individual electrical sub components are powered down during intervals when their individual function is not required. For example, electrical power is only supplied to the stepper motor 46, preamplifiers 26, A/D converters 32, digital processor 36, memory 38,54, port 39 and display 52 during those intervals when their individual respective function is required.

While various components and parts may be interchanged as taught in the preferred embodiments of the invention herein described, those skilled in the art recognize instantiations coming within the spirit and scope of the invention, as defined in the appended claims to which this patent is directed.

We claim:

1. A self-contained infrared camera including a camera housing for enclosing and supporting all components for capturing and displaying a two dimensional infrared image of a scene which emits thermal radiation, the self-contained infrared camera comprising:

a focusing lens rigidly attached to a camera housing for transmitting infrared radiation therethrough and focusing a two dimensional infrared image of said scene at an image focal plane perpendicular to an optical axis of said focusing lens;

thermoelectric sensor array assembly means including a plurality of linearly arranged thermoelectric sensors, $S_m$, aligned with a sensor reference axis passing through said plurality of sensors, each of said plurality of thermoelectric sensors being capable of providing raw infrared sensor information, $R_m$, in response to sensed infrared radiation impinging thereon, and where M is the number of said plurality of linearly arranged thermoelectric sensors and where "m" designates the $m^{th}$ position along said sensor reference axis;

support means for rigidly supporting said linear thermoelectric sensor array assembly means;

linear scanning means, responsive to a command signal, for controllably moving said support means to discrete scan positions, $P_n$, along a reference scan axis perpendicular to said optical axis, said support means coupled to and arranged relative to said scanning means such that said sensor reference axis is substantially perpendicular to said reference scan axis and said optical axis, where "n" represents the $n^{th}$ position along said reference scan axis, and where said linear scanning means is capable of moving said plurality of thermoelectric sensors in alignment with said focal plane so as to be responsive to said infrared image;

storage means for storing unique thermoelectric sensor calibration information, $C_{mn}$, for each one of said sensors, $S_m$, and corresponding discrete scan positions, $P_n$, where said unique sensor calibration information is related to unique raw infrared sensor information of each of said plurality of said thermoelectric sensors at said discrete scan positions in response to known infrared radiation passing through said focusing lens and impinging thereon;

signal processing means for, providing said command signal such that said scanning means controllably moves said support means to successive ones of said discrete scan positions, $P_n$, for a selected measurement time, such that at least some of said plurality of sensors, $S_m$, pass through the field of view of said infrared image in the direction of said scan axis, and provide said raw infrared sensor information for each discrete scan position, $R_{mn}$, in response to any infrared radiation impinging thereon, where $R_{mn}$ represents said raw infrared sensor information for the $m^{th}$ thermoelectric sensor at the $n^{th}$ discrete scan position, and deriving corrected infrared sensor information, $Q_{mn}$, for each of said plurality of thermoelectric sensors, $S_m$, at each of said discrete scan positions, $P_n$, as a function of corresponding ones of said raw infrared sensor information, $R_{mn}$, and said thermoelectric sensor calibration information, $C_{mn}$, and said corrected infrared sensor information, $Q_{mn}$, represents corrected raw infrared information associated with the $m^{th}$ thermoelectric sensor at the $n^{th}$ discrete scan position; and display means rigidly attached to said camera body for displaying an 2 dimensional visual image, M×N, representation of said corrected infrared sensor information, $Q_{mn}$, so as to provide a visual representation of said infrared image, where said visual image has one axis which represents successive discrete scan positions, and another display axis which represents said sensor reference axis.

2. The self-contained infrared camera of claim 1 further comprising:

reference plate means having known infrared emissivity and temperature for emanating known infrared radiation; and means for subjecting said plurality of said sensors to said known infrared radiation emanating from said reference plate;

means for determining discrete sensor offset information, $X_m$, associated with each of said plurality of thermoelectric sensors, $S_m$, in response to raw infrared sensor information resulting from said known infrared radiation emanating from said reference plate; and wherein said corrected infrared sensor information, $Q_{mn}$, for each of said plurality of thermoelectric sensors, $S_m$, at each of said discrete scan positions, $P_n$, is derived as a function of corresponding ones of said raw infrared sensor information, $R_{mn}$, said thermoelectric sensor calibration information, $C_{mn}$, and said discrete sensor offset information, $X_m$.

3. The self-contained infrared camera of claim 2 where in said signal processing means is capable of commanding said linear scanning means to position said support means to a position such that said plurality of said thermoelectric sensors receives infrared radiation directly from said reference plate.

4. The self-contained infrared camera of claim 1 where in said calibration information is in the form of calibration constants whereby said raw infrared sensor information from each of said thermoelectric sensors at a discrete scan position in response to infrared image of a scene is corrected to derive said corrected infrared sensor information, $Q_{mn}$.

5. The self-contained infrared camera of claim 1 wherein, signal processing means provides said command signal such that said scanning means controllably moves said support means to a discrete scan positions, $P_o$ such that said sensor reference axis substantially intersects said optical axis thereby centrally placing said plurality of thermoelectric sensors centrally in the field of view of said infrared image;

said signal processing means further including means for, sampling raw infrared sensor information, $R_{mr}$, for each of said plurality of thermoelectric sensors, $S_m$, for discrete sample times, $t_r$, in response to any infrared radiation impinging thereon, and deriving corrected infrared sensor information, $Q_{mr}$, for each of said plurality of thermoelectric sensors, $S_m$, as a function of corresponding ones of said raw infrared sensor information, $R_{mr}$, and said thermoelectric sensor calibration information, $C_{mo}$, and where said display means display means provides a visual representation of an object passing through the field of view of said focusing lens, where said visual image has one axis which represents successive discrete sample times, $t_r$, and another display axis represents said sensor reference axis.

6. The camera of claim 1 wherein said selected measurement time is the response time of said thermoelectric sensor.

7. A self-contained infrared camera including a camera housing for enclosing and supporting all components for capturing and displaying a two dimensional infrared image of a moving object which emits thermal radiation, the self-contained infrared camera comprising:

a focusing lens rigidly attached to a camera housing for transmitting infrared radiation therethrough and focusing a two dimensional infrared image of an object in the field of view of said focusing lens at an image focal plane perpendicular to an optical axis of said focusing lens;

thermoelectric sensor array assembly means including a plurality of linearly arranged thermoelectric sensors, $S_m$, aligned with a sensor reference axis passing through said plurality of sensors, each of said plurality of thermoelectric sensors being capable of providing raw infrared sensor information, $R_m$, in response to sensed infrared radiation impinging thereon, and where M is the number of said plurality of linearly arranged thermoelectric sensors and where "m" designates the $m^{th}$ position along said sensor reference axis;

support means for rigidly supporting said linear thermoelectric sensor array assembly means such that said sensor reference axis is perpendicular to and substantially intersects said optical axis;

storage means for storing unique thermoelectric sensor calibration information, $C_m$, for each one of said sensors, $S_m$, where said unique sensor calibration information is related to unique raw infrared sensor information of each of said plurality of said thermoelectric sensors in response to known infrared radiation passing through said focusing lens and impinging thereon;

signal processing means for, sampling raw infrared sensor information, $R_{mr}$, for each of said plurality of thermoelectric sensors, $S_m$, for discrete sample times, $t_r$, in response to any infrared radiation impinging thereon, and deriving corrected infrared sensor information, $Q_{mr}$ for each of said plurality of thermoelectric sensors, $S_m$, as a function of corresponding ones of said raw infrared sensor information, $R_{mr}$ and said thermoelectric sensor calibration information, $C_m$;

display means rigidly attached to said camera body for displaying a 2 dimensional visual image representation of said corrected infrared sensor information, $Q_{mr}$ associated with each of said plurality of thermoelectric sensors, $S_m$, so as to provide a visual representation of said object passing through the field of view of said focusing lens, where said visual image has one axis which represents successive discrete sample times, $t_s$, and another display axis which represents said sensor reference axis.

8. The self-contained infrared camera of claim 7 further comprising:

reference plate means having known infrared emissivity and temperature for providing known infrared radiation; and means for subjecting said plurality of said sensors to said known infrared radiation emanating from said reference plate;

means for determining discrete sensor offset information, $X_m$, associated with each of said plurality of thermoelectric sensors, $S_m$, in response to raw infrared sensor information resulting from said known infrared radiation emanating from said reference plate; and wherein said corrected infrared sensor information, $Q_{mr}$ for each of said plurality of thermoelectric sensors, $S_m$, is derived as a function of corresponding ones of said raw infrared sensor information, $R_{mr}$ said thermoelectric sensor calibration information, $C_m$ and said discrete sensor offset information, $X_m$.

9. A infrared camera including a camera housing for enclosing and supporting components for capturing a two dimensional infrared image of a scene which emits thermal radiation, the infrared camera comprising:

a focusing lens rigidly attached to a camera housing for transmitting infrared radiation therethrough and focusing a two dimensional infrared image of said scene at an image focal plane perpendicular to an optical axis of said focusing lens;

thermoelectric sensor array assembly means including a plurality of linearly arranged thermoelectric sensors, $S_m$, aligned with a sensor reference axis passing through said plurality of sensors, each of said plurality of thermoelectric sensors being capable of providing raw infrared sensor information, $R_m$, in response to sensed infrared radiation impinging thereon, and where M is the number of said plurality of linearly arranged thermoelectric sensors and where "m" designates the $m^{th}$ position along said sensor reference axis;

support means for rigidly supporting said linear thermoelectric sensor array assembly means;

linear scanning means, responsive to a command signal, for controllably moving said support means to discrete scan positions, $P_n$, along a reference scan axis perpendicular to said optical axis, said support means coupled to and arranged relative to said scanning means such that said sensor reference axis is substantially perpendicular to said reference scan axis and said optical axis, where "n" represents $n^{th}$ position along said reference scan axis, and where said linear scanning means is capable of moving said plurality of thermoelectric sensors in alignment with said focal plane so as to be responsive to said infrared image;

storage means for storing unique thermoelectric sensor calibration information, $C_{mn}$, for each one of said sensors, $S_m$, and corresponding discrete scan positions, $P_n$, where said unique sensor calibration information is related to unique raw infrared sensor information of each of said plurality of said thermoelectric sensors at said discrete scan positions in response to known infrared radiation passing through said focusing lens and impinging thereon; and signal processing means for, providing said command signal such that said scanning means controllably moves said support means to successive ones of said discrete scan positions, $P_n$, for a selected measurement time, such that at least some of said plurality of sensors, $S_m$, pass through the field of view of said infrared image in the direction of said scan axis, and provide said raw infrared sensor information for each discrete scan position, $R_{mn}$, in response to any infrared radiation impinging thereon, where $R_{mn}$ represents said raw infrared sensor information for the $m^{th}$ thermoelectric sensor at the $n^{th}$ discrete scan position, and deriving corrected infrared sensor information, $Q_{mn}$, for each of said plurality of thermoelectric sensors, $S_m$, at each of said discrete scan positions, $P_n$, as a function of corresponding ones of said raw infrared sensor information, $R_{mn}$, and said thermoelectric sensor calibration information, $C_{mn}$, and said corrected infrared sensor information, $Q_{mn}$, represents corrected raw infrared information associated with the $m^{th}$ thermoelectric sensor at the $n^{th}$ discrete scan position.

10. The infrared camera of claim 9 further comprising:

reference plate means having known infrared emissivity and temperature for emanating known infrared radiation; and means for subjecting said plurality of said sensors to said known infrared radiation emanating from said reference plate;

means for determining discrete sensor offset information, $X_m$, associated with each of said plurality of thermoelectric sensors, $S_m$, in response to raw infrared sensor information resulting from said known infrared radiation emanating from said reference plate; and wherein said corrected infrared sensor information, $Q_{mn}$, for each of said plurality of thermoelectric sensors, $S_m$, at each of said discrete scan positions, $P_n$, is derived as a function of corresponding ones of said raw infrared sensor information, $R_{mn}$, said thermoelectric sensor calibration information, $C_{mn}$, and said discrete sensor offset information, $X_m$.

11. The infrared camera of claim 10 where in said signal processing means is capable of commanding said linear scanning means to slidably position said support means to a position such that said plurality of said thermoelectric sensors receives radiation directly and only from said reference plate.

12. The infrared camera of claim 9 where in said calibration information is in the form of calibration constants whereby said raw infrared sensor information from each of said thermoelectric sensors at a discrete scan position in response to infrared image of a scene is corrected to derive said corrected infrared sensor information, $Q_{mn}$.

13. The infrared camera of claim 9 wherein, signal processing means provides said command signal such that said scanning means controllably moves said support means to a discrete scan positions, $P_O$ such that said sensor reference axis substantially intersects said optical thereby contrally placing said plurality of thermoelectric sensors centrally in the field of view of said infrared image; and said signal processing means further including means for, sampling raw infrared sensor information, $R_{mr}$ for each of said plurality of thermoelectric sensors, $S_m$, for discrete sample times, $t_s$, in response to any infrared radiation impinging thereon, and deriving corrected infrared sensor information, $Q_{mr}$ for each of said plurality of thermoelectric sensors, $S_m$, as a function of corresponding ones of said raw infrared sensor information, $R_{mr}$ and said thermoelectric sensor calibration information, $C_{mO}$.

14. The camera of claim 9 wherein said selected measurement time is the response time of said thermoelectric sensor.

15. An infrared camera including a camera housing for enclosing and supporting components for capturing a two dimensional infrared image of a scene which emits thermal radiation, the infrared camera comprising:

a focusing lens rigidly attached to a camera housing for transmitting infrared radiation therethrough and focusing a two dimensional infrared image of said scene at an image focal plane perpendicular to an optical axis of said focusing lens;

thermoelectric sensor array assembly means including a plurality of linearly arranged thermoelectric sensors, $S_m$, aligned with a sensor reference axis passing through said plurality of sensors, each of said plurality of thermoelectric sensors being capable of providing raw infrared sensor information, $R_m$, in response to sensed infrared radiation impinging thereon, and where M is the number of said plurality of linearly arranged thermoelectric sensors and where "m" designates the $m^{th}$ position along said sensor reference axis;

support means for rigidly supporting said linear thermoelectric sensor array assembly means;

linear scanning means, responsive to a command signal, for centrollably moving said support means to discrete scan positions, $P_n$, along a reference scan axis perpendicular to said optical axis, said support means coupled to and arranged relative to said scanning means such that said sensor reference axis is substantially perpendicular to said reference scan axis and said optical axis, where "n" represents the $n^{th}$ position along said reference scan axis, and where said linear scanning means is capable of moving said plurality of thermoelectric sensors in alignment with said focal plane so as to be responsive to said infrared image;

storage means for storing unique thermoelectric sensor calibration information, $C_m$, for each one of said sensors, $S_m$, where said unique sensor calibration information is related to unique raw infrared sensor information of each of said plurality of said thermoelectric sensors in response to known infrared radiation passing through said focusing lens and impinging thereon;

signal processing means for, providing said command signal such that said scanning means controllably moves said support means to successive ones of said discrete scan positions, $P_n$, for a selected measurement time, such that at least some of said plurality of sensors, $S_m$, pass through the field of view of said infrared image in the direction of said scan axis, and provide said raw infrared sensor information for each discrete scan position, $R_{mn}$, in response to any infrared radiation impinging thereon, where $R_{mn}$ represents said raw infrared sensor information for the $m^{th}$ thermoelectric sensor at the $n^{th}$ discrete scan position, and deriving corrected infrared sensor information, $Q_{mn}$, for each of said plurality of thermoelectric sensors, $S_m$, at each of said discrete scan positions, $P_n$, as a function of corresponding ones of said raw infrared sensor information, $R_{mn}$, and said thermoelectric sensor calibration information, $C_m$, and said corrected infrared sensor information, $Q_{mn}$, represents corrected raw infrared information associated with the $m^{th}$ thermoelectric sensor at the $n^{th}$ discrete scan position; and display means rigidly attached to said camera body for displaying an 2 dimensional visual image, M×N, representation of said corrected infrared sensor information, $Q_{mn}$, associated with each of said plurality of thermoelectric sensors, $S_m$, at each of said discrete scan positions, $P_n$, so as to provide a visual representation of said infrared image, where said visual image has one axis which represents successive discrete scan positions, and another display axis which represents said sensor reference axis.

16. The camera of claim 15 wherein said selected measurement time is the response time of said thermoelectric sensor.

* * * * *